US012783220B1

(12) United States Patent
Pozanco et al.

(10) Patent No.: US 12,783,220 B1
(45) Date of Patent: Nov. 3, 2026

(54) METHOD AND SYSTEM FOR UNDERSTANDING AND TRANSLATING LEGACY CODE

(71) Applicant: JPMorgan Chase Bank, N.A., New York, NY (US)

(72) Inventors: Alberto Pozanco, Madrid (ES); Petr Babkin, San Francisco, CA (US); Daniel Borrajo, Pozuelo de Alarcon (ES); Manuela Veloso, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 262 days.

(21) Appl. No.: 18/597,347

(22) Filed: Mar. 6, 2024

(51) Int. Cl.
*G06F 8/41* (2018.01)
*G06F 8/30* (2018.01)
*G06F 9/448* (2018.01)

(52) U.S. Cl.
CPC ................ *G06F 8/443* (2013.01); *G06F 8/30* (2013.01); *G06F 8/436* (2013.01); *G06F 9/4498* (2018.02)

(58) Field of Classification Search
CPC . G06F 8/30; G06F 8/436; G06F 8/443; G06F 9/4498
See application file for complete search history.

(56) References Cited

U.S. PATENT DOCUMENTS 7,293,261 B1 * 11/2007 Anderson ................. G06F 8/52
717/136
8,516,458 B2 * 8/2013 Stewart ................... G06F 8/427
717/145
9,471,289 B2 * 10/2016 Feng ......................... G06F 8/51
9,619,212 B2 * 4/2017 Fige ........................ G06F 8/447
9,996,328 B1 * 6/2018 Kluss .................... G06F 40/143
10,324,712 B1 * 6/2019 Nolan ....................... G06F 8/72
10,782,936 B1 * 9/2020 Davis ........................ G06F 8/72
11,144,725 B2 * 10/2021 Luo .......................... G06N 3/08
11,579,868 B1 * 2/2023 Zhang ....................... G06F 8/72
11,693,637 B1 * 7/2023 Singh ...................... G06F 8/436
717/139
12,265,615 B2 * 4/2025 Anderson .............. G06N 20/00
2016/0253155 A1 * 9/2016 McNeil ............... G06F 11/3684
717/108

(Continued)

FOREIGN PATENT DOCUMENTS

WO WO-2018236384 A1 * 12/2018 ............... G06F 8/51

*Primary Examiner* — Douglas M Slachta

(74) *Attorney, Agent, or Firm* — Greenblum & Bernstein, P.L.C.

(57) ABSTRACT

A method and a system for automatically understanding legacy code that is written in an old programming language in order to facilitate an ability to translate the legacy code into a modern programming language are provided. The method includes: receiving a set of legacy code that is written in an old programming language; receiving a corpus of code written in the old programming language; analyzing a subset of the corpus of code in order to induce a grammar of the old programming language; using the grammar to convert the set of legacy code into a finite-state machine (FSM) that is usable for detecting branches and loops of the set of legacy code; using the FSM to generate a set of pseudocode that corresponds to the set of legacy code; and optimizing the set of pseudocode in order to generate a more compact set of pseudocode.

16 Claims, 9 Drawing Sheets

(56) References Cited

U.S. PATENT DOCUMENTS

| | | | | |
|---|---|---|---|---|
| 2018/0225110 | A1* | 8/2018 | Borlick | G06F 11/3604 |
| 2020/0218634 | A1* | 7/2020 | Jones | G06F 11/3604 |
| 2022/0269580 | A1* | 8/2022 | Balasubramanian | G06F 11/3616 |
| 2024/0086164 | A1* | 3/2024 | Kramer | G06F 8/36 |
| 2025/0004727 | A1* | 1/2025 | Rudnik | G06F 8/33 |

* cited by examiner

500

```
A_rout      DS   0H                                              00790000
         STM   R14,LAST,RSA_R14                                  00800000
         LR    BASE,R15                                          00810000
                                                                 00820106
         LM    R2,R3,PARM_PTR1                                   00821006
                                                                 00821106
         DROP  R1                                                00821206
                                                                 00821306
         LA    R2,0(R2)                                          00822006
         LA    R3,0(R3)                                          00822106
                                                                 00823006
         CR    R3,R2                                             00823106
         BH    B_rout                                            00823306
                                                                 00823406
         XR    R2,R3                      comment                00823507
         XR    R3,R2                                             00823607
         XR    R2,R3                                             00823707
                                                                 00823806
B_rout      DS    0H                                             00823906
                                                                 00824008
         SR    R3,R2                      end-start              00824108
                                                                 00824208
         BR     R14                                               00824308
                                                                 00824406
 *       END                                                     01500006
```

FIG. 5

| | | | | | | |
|---|---|---|---|---|---|---|
| 767 | LR | ENTITY | COMMA | ENTITY | | |
| 768 | LR | ENTITY | COMMA | ENTITY | AMPERSAND | ENTITY |
| 769 | LR | ENTITY | AMPERSAND | ENTITY | COMMA | ENTITY |
| 770 | LR | ENTITY | COMMA | NUMBER | | |

900

METHOD AND SYSTEM FOR UNDERSTANDING AND TRANSLATING LEGACY CODE

BACKGROUND

1. Field of the Disclosure

This technology relates to methods and systems for automatically understanding legacy code that is written in an old programming language in order to facilitate an ability to translate the legacy code into a modern programming language.

2. Background Information

Legacy code remains in use for many core business applications. However, such code typically is written in old programming languages, such as, for example, some specific Assembly languages, for which the availability of documentation, support, and expert developers is extremely scarce. For these reasons, it would be very useful to translate such legacy code to higher-level and more modern programming languages, so that applications can be better maintained and/or migrated to cloud environments.

There are several challenges associated with the task of understanding and translating legacy code. A first challenge is that of documentation scarcity. All programming language have associated documentation, which includes a grammar that defines the syntactic rules of the programming language and describes which strings of characters and tokens constitute a valid program, i.e., how to write code in that language. The associated documentation also includes a semantic definition that describes what computations to apply to syntactically valid programs, i.e., what a program does. In the case of some old programming languages, this documentation is extremely scarce or nonexistent, and is often only accessible through scanned images of old books. This renders impossible any attempt of automating the acquisition and the structuring of the syntactic and semantic rules that define such programming languages.

A second challenge relates to a scarcity of domain experts. In this regard, there are very few current software developers that are experts in old languages, such as specific versions of Assembly.

A third challenge relates to data scarcity. In this aspect, the availability of code written in old languages such as Assembly is very limited. This effectively prevents the use of parallel translation approaches that require a corpus of code written in both languages, i.e., the source Assembly code, and the destination high-level language that replicates the same functionality.

A fourth challenge relates to difficulties in compiling and executing code. Typically, these old programming languages run in mainframe computers, which often lack interactive tools that can be used to debug and test the developed code. Moreover, due to running critical applications, these mainframes may be not be accessible for compiling and executing code.

In addition to these challenges, there are also the typical soundness and correctness problems that arise in any code translation/understanding task, i.e., the notion that the pseudo-code must replicate the behavior of the legacy code such that it generates the same outputs whenever provided with the same inputs.

Accordingly, there is a need for a method for automatically understanding legacy code that is written in an old programming language in order to facilitate an ability to translate the legacy code into a modern programming language.

SUMMARY

The present disclosure, through one or more of its various aspects, embodiments, and/or specific features or sub-components, provides, inter alia, various systems, servers, devices, methods, media, programs, and platforms for automatically understanding legacy code that is written in an old programming language in order to facilitate an ability to translate the legacy code into a modern programming language.

According to an aspect of the present disclosure, a method for automatically understanding legacy code is provided. The method is implemented by at least one processor. The method includes: receiving, by the at least one processor, a first set of legacy code that is written in a first programming language; receiving, by the at least one processor, a corpus of code written in the first programming language; analyzing, by the at least one processor, a subset of the corpus of code in order to induce a grammar of the first programming language; converting, by the at least one processor based on the grammar, the first set of legacy code into a finite-state machine (FSM) that is usable for detecting branches and loops of the first set of legacy code; using, by the at least one processor, the FSM to generate a first set of pseudocode that corresponds to the first set of legacy code; and optimizing, by the at least one processor, the first set of pseudocode in order to generate a second set of pseudocode that is more compact than the first set of pseudocode.

The grammar may include a plurality of syntactic rules of the first programming language that facilitate an ability to write code in the first programming language.

The optimizing may include using a set of optimization rules for grouping combinations of operators and generating a common mapping for the grouped combinations of operators.

The analyzing may include: defining a set of terminals that includes a set of character strings together with corresponding expressions that capture the character strings; assembling a set of operator-arguments pairs from the corpus and matching each respective operator-arguments pair with a corresponding terminal from within the set of terminals; generating a respective rule for each operator-arguments pair; and iteratively collapsing a plurality of terminal combinations into reusable non-terminals.

The FSM may be expressible as a set of tuples within which each respective tuple includes a first element that relates to a set of states that are defined by respective attributes and a second element that relates to a set of transitions that facilitate movement across states.

The FSM may include a compact FSM for which each state is represented by a respective line number that is currently being executed by the first set of legacy code.

Alternatively, the FSM may include a full FSM for which each state is represented by a respective line number, a respective set of register values, a respective set of condition codes, and a set of memory content that correspond to the first set of legacy code.

The analyzing may include applying an artificial intelligence (AI) model that is trained by using a plurality of code corpuses that respectively correspond to a plurality of programming languages.

The first programming language may include an Assembly language.

According to another exemplary embodiment, a computing apparatus for automatically understanding legacy code is provided. The computing apparatus includes a processor; a memory; and a communication interface coupled to each of the processor and the memory. The processor is configured to: receive, via the communication interface, a first set of legacy code that is written in a first programming language; receive a corpus of code written in the first programming language; analyze a subset of the corpus of code in order to induce a grammar of the first programming language; convert, based on the grammar, the first set of legacy code into an FSM that is usable for detecting branches and loops of the first set of legacy code; use the FSM to generate a first set of pseudocode that corresponds to the first set of legacy code; and optimize the first set of pseudocode in order to generate a second set of pseudocode that is more compact than the first set of pseudocode.

The grammar may include a plurality of syntactic rules of the first programming language that facilitate an ability to write code in the first programming language.

The processor may be further configured to perform the optimization by using a set of optimization rules for grouping combinations of operators and generating a common mapping for the grouped combinations of operators.

The processor may be further configured to perform the analysis by: defining a set of terminals that includes a set of character strings together with corresponding expressions that capture the character strings; assembling a set of operator—arguments pairs from the corpus and matching each respective operator-arguments pair with a corresponding terminal from within the set of terminals; generating a respective rule for each operator-arguments pair; and iteratively collapsing a plurality of terminal combinations into reusable non-terminals.

The FSM may be expressible as a set of tuples within which each respective tuple includes a first element that relates to a set of states that are defined by respective attributes and a second element that relates to a set of transitions that facilitate movement across states.

The FSM may include a compact FSM for which each state is represented by a respective line number that is currently being executed by the first set of legacy code.

Alternatively, the FSM may include a full FSM for which each state is represented by a respective line number, a respective set of register values, a respective set of condition codes, and a set of memory content that correspond to the first set of legacy code.

The processor may be further configured to perform the analysis by applying an artificial intelligence (AI) model that is trained by using a plurality of code corpuses that respectively correspond to a plurality of programming languages.

The first programming language may include an Assembly language.

According to yet another exemplary embodiment, a non-transitory computer readable storage medium storing instructions for automatically understanding legacy code is provided. The storage medium includes executable code which, when executed by a processor, causes the processor to: receive a first set of legacy code that is written in a first programming language; receive a corpus of code written in the first programming language; analyze a subset of the corpus of code in order to induce a grammar of the first programming language; convert, based on the grammar, the first set of legacy code into an FSM that is usable for detecting branches and loops of the first set of legacy code; use the FSM to generate a first set of pseudocode that corresponds to the first set of legacy code; and optimize the first set of pseudocode in order to generate a second set of pseudocode that is more compact than the first set of pseudocode.

The grammar may include a plurality of syntactic rules of the first programming language that facilitate an ability to write code in the first programming language.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5 is an illustration of an excerpt of a High-Level Assembly (HLASM) program.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
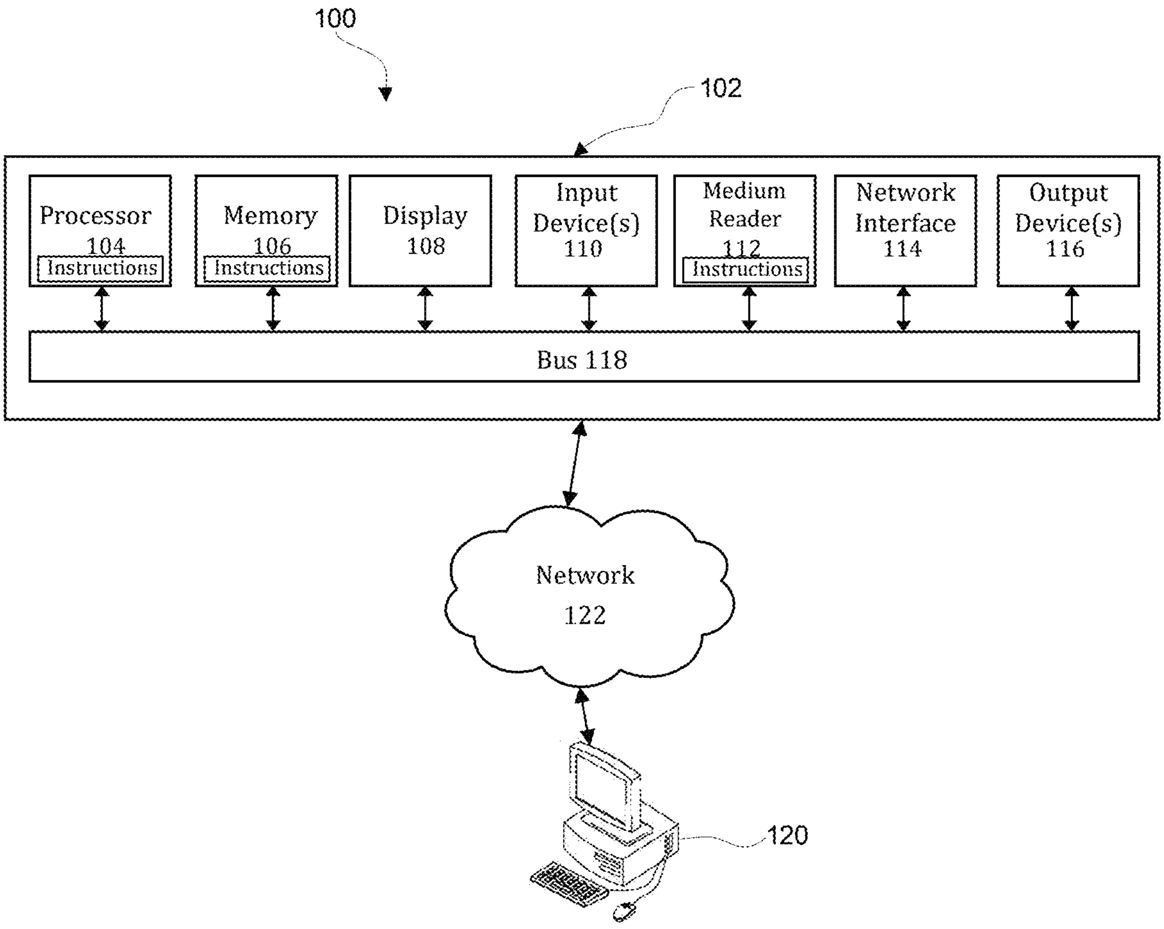
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automatically understanding legacy code that is written in an old programming language in order to facilitate an ability to translate the legacy code into a modern programming language.

Figure 2:
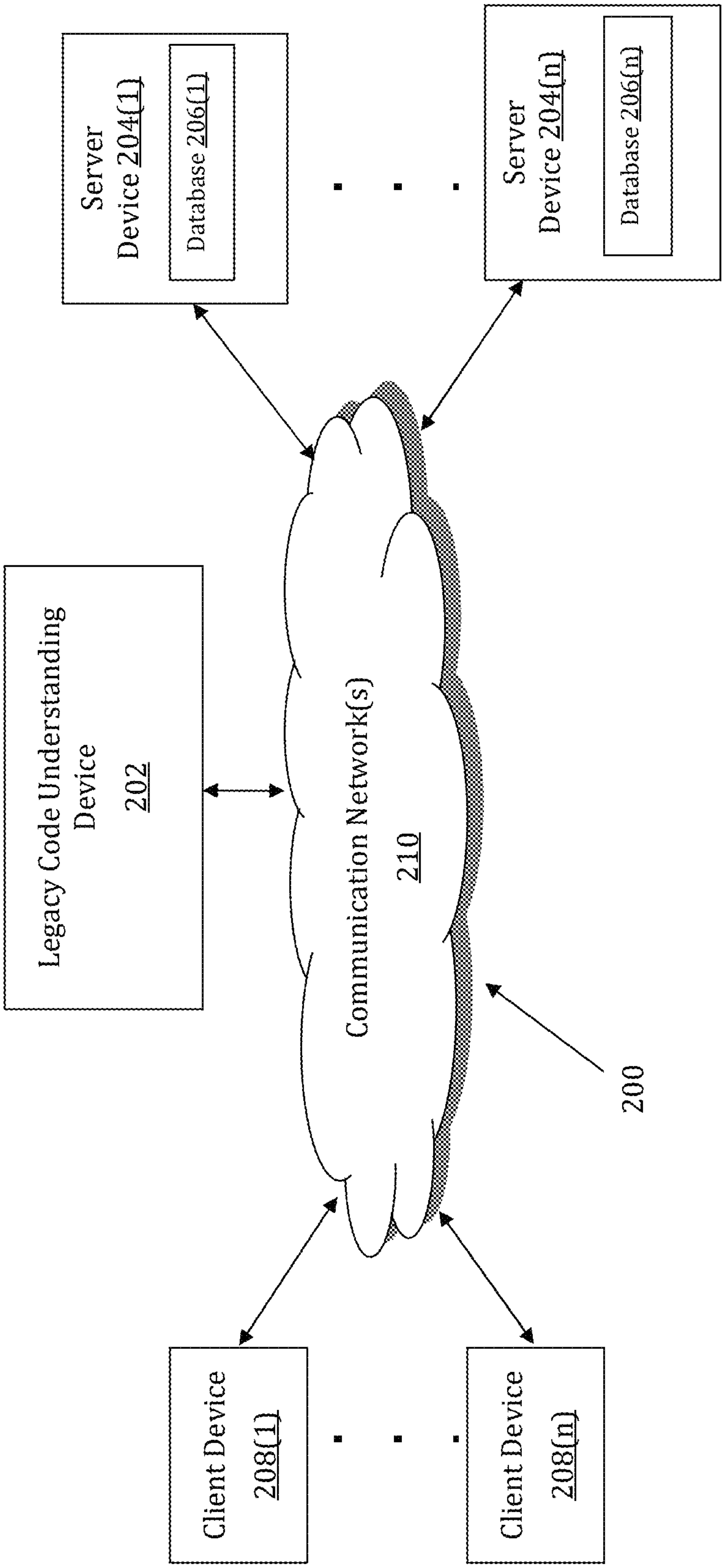
FIG. 2 illustrates an exemplary diagram of a network environment.

Referring to FIG. 2, a schematic of an exemplary network environment 200 for implementing a method for automatically understanding legacy code that is written in an old programming language in order to facilitate an ability to translate the legacy code into a modern programming language is illustrated. In an exemplary embodiment, the method is executable on any networked computer platform, such as, for example, a personal computer (PC).

The method for automatically understanding legacy code that is written in an old programming language in order to facilitate an ability to translate the legacy code into a modern programming language may be implemented by a Legacy Code Understanding (LCU) device 202. The LCU device 202 may be the same or similar to the computer system 102 as described with respect to FIG. 1. The LCU device 202 may store one or more applications that can include executable instructions that, when executed by the LCU device 202, cause the LCU device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the LCU device 202 itself, may be located in virtual server(s) running in a cloud-based computing environment rather than being tied to one or more specific physical network computing devices. Also, the application(s) may be running in one or more virtual machines (VMs) executing on the LCU device 202. Additionally, in one or more embodiments of this technology, virtual machine(s) running on the LCU device 202 may be managed or supervised by a hypervisor.

In the network environment 200 of FIG. 2, the LCU device 202 is coupled to a plurality of server devices 204(1)-204 (*n*) that hosts a plurality of databases 206(1)-206 (*n*), and also to a plurality of client devices 208(1)-208 (*n*) via communication network(s) 210. A communication interface of the LCU device 202, such as the network interface 114 of the computer system 102 of FIG. 1, operatively couples and communicates between the LCU device 202, the server devices 204(1)-204 (*n*), and/or the client devices 208(1)-208 (*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the LCU device 202, the server devices 204(1)-204 (*n*), and/or the client devices 208(1)-208 (*n*) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and LCU devices that efficiently implement a method for automatically understanding legacy code that is written in an old programming language in order to facilitate an ability to translate the legacy code into a modern programming language.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The LCU device 202 may be a standalone device or integrated with one or more other devices or apparatuses, such as one or more of the server devices 204(1)-204 (*n*), for example. In one particular example, the LCU device 202 may include or be hosted by one of the server devices 204(1)-204 (*n*), and other arrangements are also possible. Moreover, one or more of the devices of the LCU device 202 may be in a same or a different communication network including one or more public, private, or cloud networks, for example.

The plurality of server devices 204(1)-204 (*n*) may be the same or similar to the computer system 102 or the computer device 120 as described with respect to FIG. 1, including any features or combination of features described with respect thereto. For example, any of the server devices 204(1)-204 (*n*) may include, among other features, one or more processors, a memory, and a communication interface, which are coupled together by a bus or other communication link, although other numbers and/or types of network devices may be used. The server devices 204(1)-204 (*n*) in this example may process requests received from the LCU device 202 via the communication network(s) 210 according to the HTTP-based and/or JavaScript Object Notation (JSON) protocol, for example, although other protocols may also be used.

The server devices 204(1)-204 (*n*) may be hardware or software or may represent a system with multiple servers in a pool, which may include internal or external networks. The server devices 204(1)-204 (*n*) hosts the databases 206(1)-206 (*n*) that are configured to store information that relates to legacy programs and information that relates to programming languages associated with legacy programs.

Although the server devices 204(1)-204 (*n*) are illustrated as single devices, one or more actions of each of the server devices 204(1)-204 (*n*) may be distributed across one or more distinct network computing devices that together comprise one or more of the server devices 204(1)-204 (*n*). Moreover, the server devices 204(1)-204 (*n*) are not limited to a particular configuration. Thus, the server devices 204 (1)-204 (*n*) may contain a plurality of network computing devices that operate using a master/slave approach, whereby one of the network computing devices of the server devices 204(1)-204 (*n*) operates to manage and/or otherwise coordinate operations of the other network computing devices.

The server devices 204(1)-204 (*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208 (*n*) may also be the same or similar to the computer system 102 or the computer device 120 as described with respect to FIG. 1, including any features or combination of features described with respect thereto. For example, the client devices 208 (1)-208 (*n*) in this example may include any type of computing device that can interact with the LCU device 202 via communication network(s) 210. Accordingly, the client devices 208(1)-208 (*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208 (*n*) may run interface applications, such as standard web browsers or standalone client applications, which may provide an interface to communicate with the LCU device 202 via the communication network(s) 210 in order to communicate user requests and information. The client devices 208(1)-208 (*n*) may further include, among other features, a display device, such as a display screen or touchscreen, and/or an input device, such as a keyboard, for example.

Although the exemplary network environment 200 with the LCU device 202, the server devices 204(1)-204 (*n*), the client devices 208(1)-208 (*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the LCU device 202, the server devices 204(1)-204 (*n*), or the client devices 208(1)-208 (*n*), for example, may be configured to operate as virtual instances on the same physical machine. In other words, one or more of the LCU device 202, the server devices 204(1)-204 (*n*), or the client devices 208(1)-208 (*n*) may operate on the same physical device rather than as separate devices communicating through communication network(s) 210. Additionally, there may be more or fewer LCU devices 202, server devices 204(1)-204 (*n*), or client devices 208(1)-208 (*n*) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
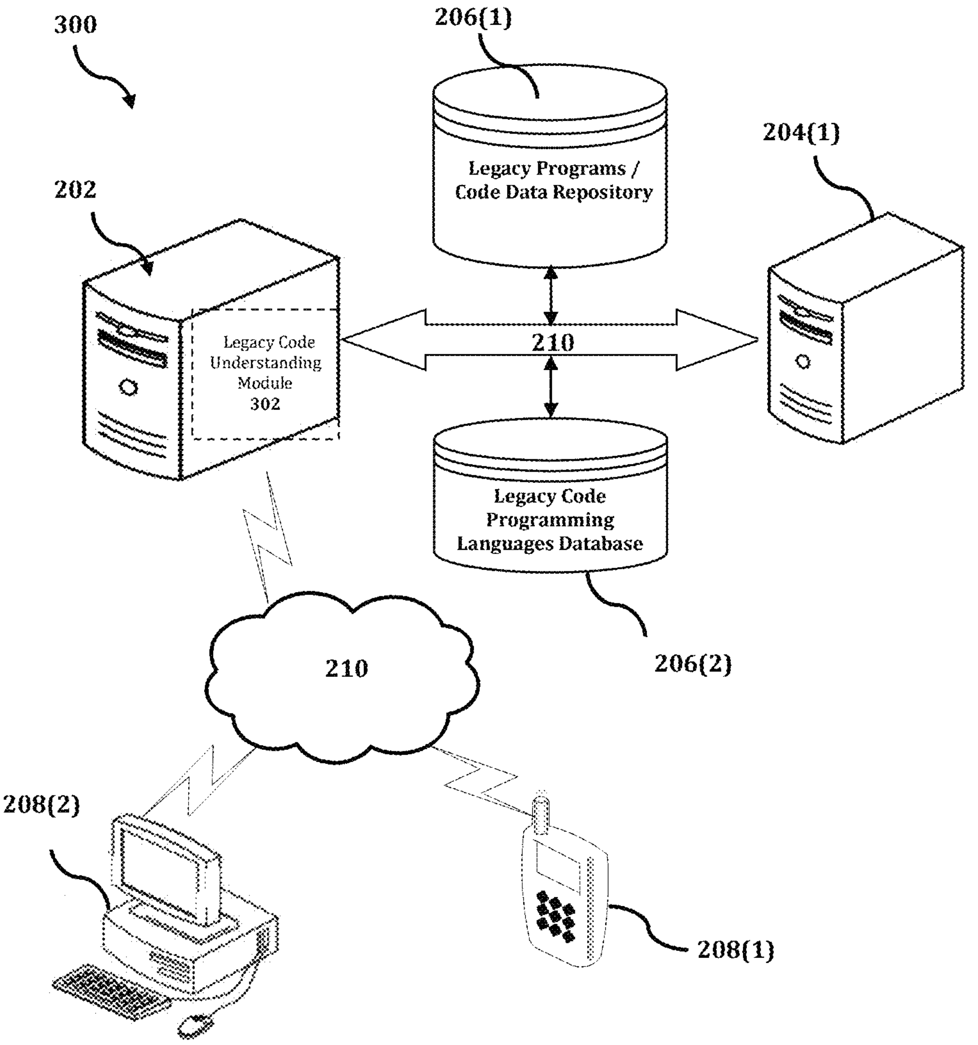
FIG. 3 shows an exemplary system for implementing a method for automatically understanding legacy code that is written in an old programming language in order to facilitate an ability to translate the legacy code into a modern programming language.

The LCU device 202 is described and illustrated in FIG. 3 as including a legacy code understanding module 302, although it may include other rules, policies, modules, databases, or applications, for example. As will be described below, the legacy code understanding module 302 is configured to implement a method for automatically understanding legacy code that is written in an old programming language in order to facilitate an ability to translate the legacy code into a modern programming language.

An exemplary process 300 for implementing a mechanism for automatically understanding legacy code that is written in an old programming language in order to facilitate an ability to translate the legacy code into a modern programming language by utilizing the network environment of FIG. 2 is illustrated as being executed in FIG. 3. Specifically, a first client device 208(1) and a second client device 208(2) are illustrated as being in communication with LCU device 202. In this regard, the first client device 208(1) and the second client device 208(2) may be "clients" of the LCU device 202 and are described herein as such. Nevertheless, it is to be known and understood that the first client device 208(1) and/or the second client device 208(2) need not necessarily be "clients" of the LCU device 202, or any entity described in association therewith herein. Any additional or alternative relationship may exist between either or both of the first client device 208(1) and the second client device 208(2) and the LCU device 202, or no relationship may exist.

Further, LCU device 202 is illustrated as being able to access a legacy programs/code data repository 206(1) and a legacy code programming languages database 206(2). The legacy code understanding module 302 may be configured to access these databases for implementing a method for automatically understanding legacy code that is written in an old programming language in order to facilitate an ability to translate the legacy code into a modern programming language.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the LCU device 202 via broadband or cellular communication. Of course, these embodiments are merely exemplary and are not limiting or exhaustive.

Upon being started, the legacy code understanding module 302 executes a process for automatically understanding legacy code that is written in an old programming language in order to facilitate an ability to translate the legacy code into a modern programming language. An exemplary process for automatically understanding legacy code that is written in an old programming language in order to facilitate an ability to translate the legacy code into a modern programming language is generally indicated at flowchart 400 in FIG. 4.

Figure 4:
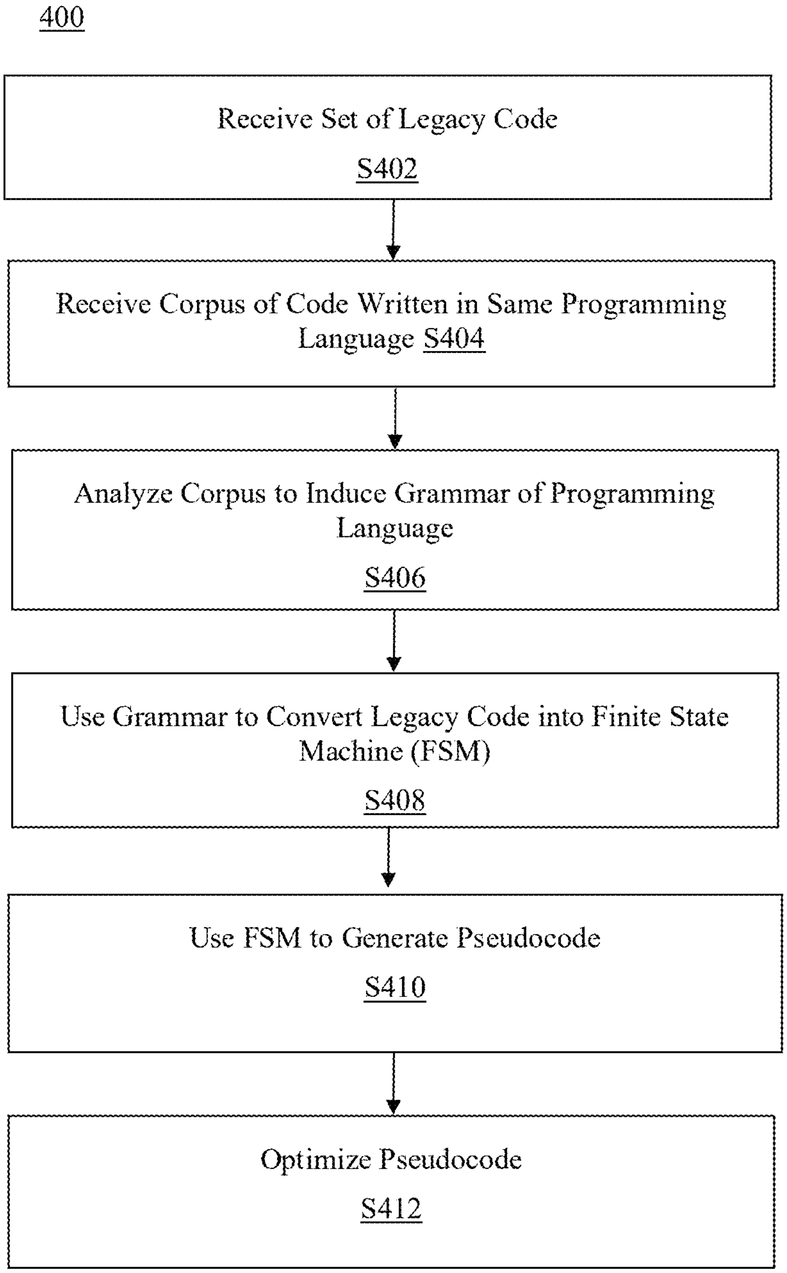
FIG. 4 is a flowchart of an exemplary process for implementing a method for automatically understanding legacy code that is written in an old programming language in order to facilitate an ability to translate the legacy code into a modern programming language.

In process 400 of FIG. 4, at step S402, the legacy code understanding module 302 receives a first set of legacy code that is written in a first programming language. In an exemplary embodiment, the first programming language is an old language for which there is a relative scarcity of documentation, data, and domain expertise, such as, for example, an Assembly language.

At step S404, the legacy code understanding module 302 receives a corpus of code that is written in the first programming language, i.e., the same language as that used for writing the first set of legacy code. Then, at step S406, the legacy code understanding module 302 analyzes the corpus of code in order to induce a grammar of the first programming language. In an exemplary embodiment, the grammar includes a set of syntactic rules that facilitate an ability to write code in the first programming language.

In an exemplary embodiment, the analysis performed in step S406 includes the following steps: defining a set of terminals that includes a set of character strings together with corresponding expressions that capture the character strings; assembling a set of operator-arguments pairs from the corpus and matching each respective operator-arguments pair with a corresponding terminal from within the set of terminals; generating a respective rule for each operator-arguments pair; and iteratively collapsing some terminal combinations into reusable non-terminals. In an exemplary embodiment, the analysis is performed by applying an artificial intelligence (AI) model that is trained by using a plurality of code corpuses that respectively correspond to a plurality of programming languages.

At step S408, the legacy code understanding module 302 uses the grammar to convert the first set of legacy code into a finite-state machine (FSM) that is usable for detecting branches and loops of the first set of legacy code. In an exemplary embodiment, the FSM is expressible as a set of tuples within which each respective tuple includes two elements: a first element that relates to a set of states that are defined by respective attributes and/or features; and a second element that relates to a set of transitions that facilitate movement across states.

In an exemplary embodiment, the FSM may be either a compact FSM or a full FSM. In the compact FSM, each state is represented by a respective line number that is currently being executed by the first set of legacy code. In the full FSM, each state is represented by a respective line number, a respective set of register values, a respective set of condition codes, and a set of memory content, each of which corresponds to the first set of legacy code.

At step S410, the legacy code understanding module 302 uses the FSM to generate a set of pseudocode. Then, at step S412, the legacy code understanding module 302 optimizes the set of pseudocode in order to generate a more compact set of pseudocode. In an exemplary embodiment, the optimization is performed by using a predetermined set of optimization rules for grouping combinations of operators and generating a common mapping for the grouped combinations of operators.

In an exemplary embodiment, the present inventive concept is intended as a response to the following research question: How can an automated AI system understand legacy code, and generate code logic flow and pseudocode to help developers in translating this legacy code into higher-level languages?

In an exemplary embodiment, the proposed methodology is general and is designed to work for any legacy code understanding task. For purposes of description, the High-Level Assembly (HLASM) language is used herein as a running example. HLASM is a programming language that allows the use of higher-level language constructs to aid assembly developers by fully supporting features such as advanced data types and function abstraction.

Figure 6:
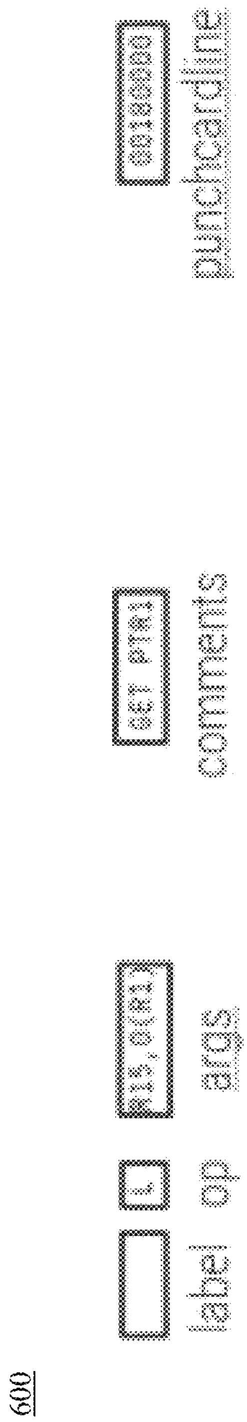
FIG. 6 is an illustration of an example of a structure of an HLASM instruction.

FIG. 5 is an illustration 500 of an excerpt of an HLASM program. As shown in FIG. 5, each line in the file represents an HLASM instruction. FIG. 6 is an illustration 600 of an example of a structure of an HLASM instruction. As shown in FIG. 6, each instruction is structured into 1) an optional label; 2) an operator code mnemonic; 3) arguments of the operator; 4) an optional comment; and 5) a punchcard line.

Figure 7:
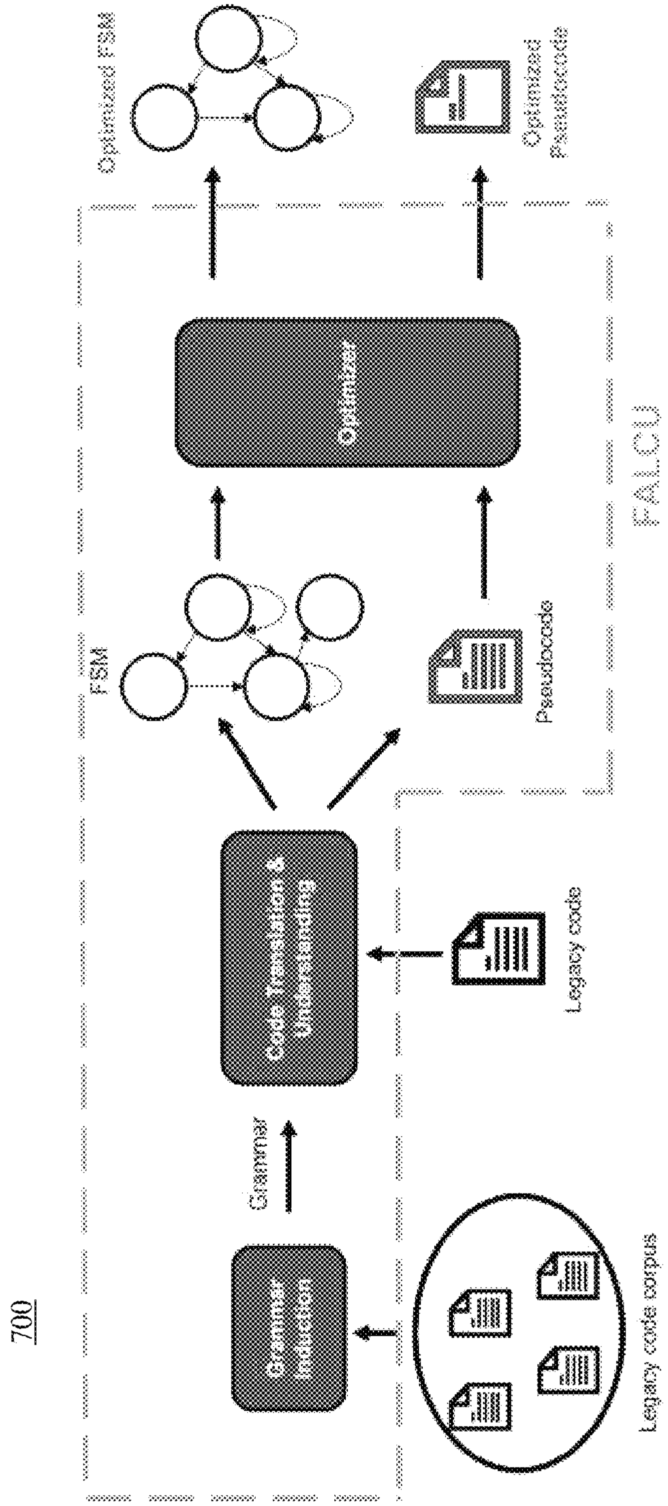
FIG. 7 is a diagram that illustrates an architecture of a system that implements a method for automatically understanding legacy code that is written in an old programming language in order to facilitate an ability to translate the legacy code into a modern programming language, according to an exemplary embodiment.

FIG. 7 is a diagram 700 that illustrates an architecture of a system that implements a method for automatically understanding legacy code that is written in an old programming language in order to facilitate an ability to translate the legacy code into a modern programming language, according to an exemplary embodiment. As shown in FIG. 7, the system receives two inputs: 1) the legacy code to be translated; and 2) a corpus of code written in the same language, which is to be used for learning the syntax of the code's language.

As shown in FIG. 7, in an exemplary embodiment, the system induces the grammar (also referred to herein as "syntax") of the language of the legacy code by analyzing a set of programs written in the same language. This grammar provides all of the possible sequences of strings that amount to a syntactically valid program. In particular, it is desired to learn all possible combinations of operator-arguments pairs that might be found in syntactically valid programs.

Figures 8, 9:
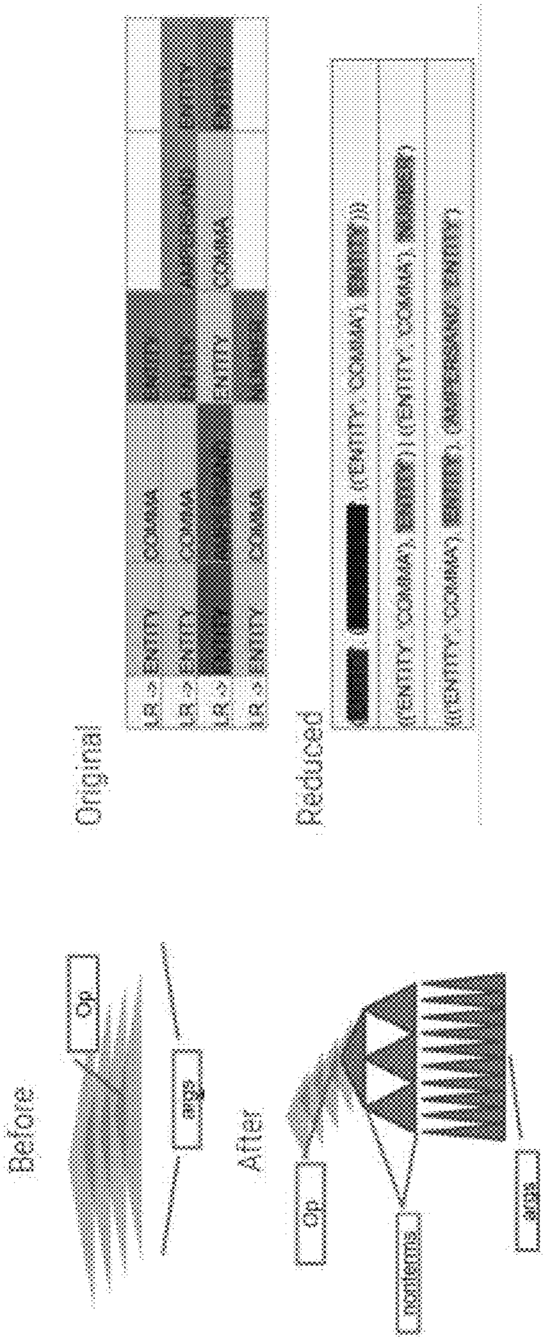
FIG. 8 is an illustration of a set of rules that is induced for a load register operator that is associated with an old programming language.
FIG. 9 is an illustration of a schematic representation of a hierarchical grammar induction that is associated with an old programming language.

FIG. 8 is an illustration 800 of a set of rules that is induced for a load register operator that is associated with an old programming language. FIG. 9 is an illustration 900 of a schematic representation of a hierarchical grammar induction that is associated with an old programming language.

In an exemplary embodiment, the grammar induction procedure is divided into four steps. First, a set of terminals is defined. In this context, the set of terminals refers to a set of strings that have some meaning in the programming language of interest.

The second step is to extract all of the operator-arguments pairs of all the programs in the corpus, and then parse the operator-arguments pairs with the terminals defined in the first step. The effect of this second step is to move from the actual program to a representation of the program with only the set of terminals.

The third step is to create a respective rule for each operator-arguments pair. Referring to FIG. 8, an example is shown for four rules that have been induced for the Load Register (LR) operator in the HLASM language, i.e., the four different ways in which this operator can be written. The output of this third steps is a shallow grammar within which there are exactly as many rules as the number of operator-arguments pairs.

The fourth and final step is to move from a shallow grammar to a hierarchical grammar by iteratively collapsing frequent terminal combinations into reusable non-terminals. Referring to FIG. 9, a schematic representation of this process is shown, together with an example of this compression for the LR rules shown in FIG. 8.

Referring again to FIG. 7, in an exemplary embodiment, the next step is to move from a sequence of instructions to a formal representation that allows for an understanding of how the program is executed, i.e., by detecting the possible branches and loops of the code. To accomplish this objective, the program may be formalized as a Finite-State Machine (FSM). An FSM is an abstract model of computation that can be used to represent and reason over execution flows. FSMs are often used to model problems in various fields, such as mathematics, AI, games, and linguistics.

In an exemplary embodiment, FSMs are defined as tuples <S, T> where: 1) The first element refers to a set of states S defined by features or attributes. In this situation, states in the FSM represent the different computation states of the Assembly program. 2) The second element refers to a set of transitions T that allows the FSM to move across states. In this situation, these transitions correspond to the different operators, which change the status of the Assembly program, thereby allowing the FSM to transition between states.

In an exemplary embodiment, two different types of FSM may be used, depending on the granularity for representing the states. A first type of FSM allows for compact representation. In this case, the state is only represented by the line number that the program is currently in. This compact representation allows humans to quickly understand code structure, i.e., detect branches, loops, end points, and other structural aspects of the program.

A second type of FSM allows for full representation. In this case, the state is represented by the line number, register values, condition codes, and memory content. This full representation allows for a formal verification of properties of the code and also for tracking variable values.

These two types of FSMs are an output of the system that facilitates an ability of humans to understand certain properties and abstract behaviors of the code. However, the FSMs can also be leveraged to generate human-readable descriptions of what the Assembly code is doing. These descriptions are referred to as pseudocode, and in an exemplary embodiment, they may be generated by traversing the FSMs, and having one respective template mapping for each of the operator-arguments pairs in the induced grammar.

Figure 10:
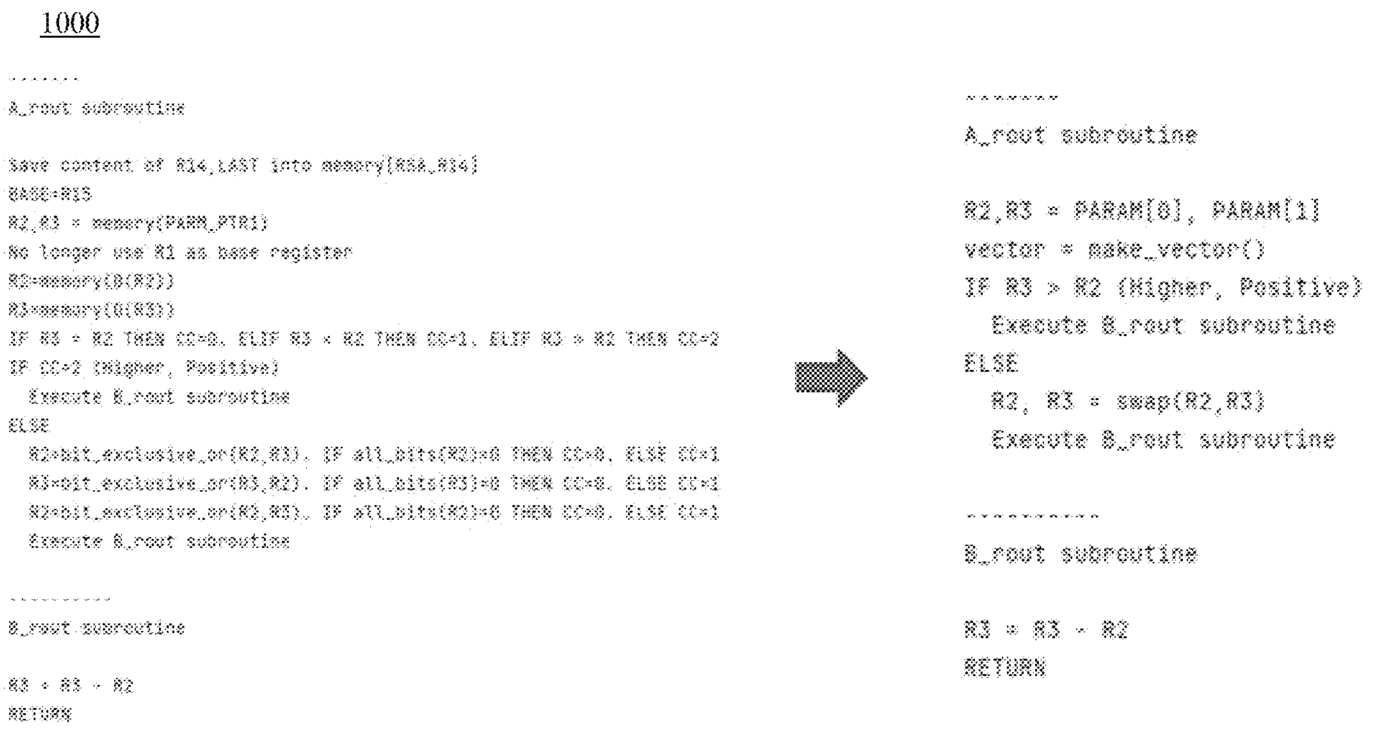
FIG. 10 is an illustration of a code optimization procedure for moving from low-level pseudocode to high-level pseudocode in a method for automatically understanding legacy code that is written in an old programming language in order to facilitate an ability to translate the legacy code into a modern programming language, according to an exemplary embodiment.

The pseudocode might be too low level. In an exemplary embodiment, in order to make the pseudocode more amenable for humans to understand and follow, an optimization procedure may be applied to generate high-level pseudocode. This may be accomplished by defining a set of optimization rules that group together certain combinations of operators, and then generating a common mapping for the grouped combinations of operators. FIG. 10 is an illustration 1000 of a code optimization procedure for moving from low-level pseudocode to high-level pseudocode. For example, as shown in FIG. 10, three XR operators may be converted into a single swap operation.

In an exemplary embodiment, the optimization procedure may rely on having a pre-specified set of optimization rules by which certain combinations of operators are grouped together, as described above. Alternatively, it may be possible to learn optimization rules through the interactions of users with the system. When a human reviews the pseudocode, any modification to the pseudocode could be incorporated as a new optimization rule, so that the system is constantly learning how to abstract the low-level pseudocode and is able to adapt to a desired level of detail.

Accordingly, with this technology, an optimized process for automatically understanding legacy code that is written in an old programming language in order to facilitate an ability to translate the legacy code into a modern programming language is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for automatically understanding legacy code, the method being implemented by at least one processor, the method comprising:

receiving, by the at least one processor, a first set of legacy code that is written in a first programming language;

receiving, by the at least one processor, a corpus of code written in the first programming language;

analyzing, by the at least one processor, a subset of the corpus of code in order to induce a grammar of the first programming language, wherein the analyzing comprises applying an artificial intelligence (AI) model that is trained by using a plurality of code corpuses that respectively correspond to a plurality of programming languages, wherein the grammar provides all possible sequences of strings that amount to a syntactically valid program, and wherein the all possible sequences of strings include all possible combination of operator-argument pairs;

converting, by the at least one processor based on the grammar, the first set of legacy code into a finite-state machine (FSM) that is usable for detecting branches and loops of the first set of legacy code, wherein the FSM is expressible as a set of tuples within which each respective tuple includes a first element that relates to a set of states that are defined by respective attributes and a second element that relates to a set of transitions that facilitate movement across states;

using, by the at least one processor, the FSM to generate a first set of pseudocode that corresponds to the first set of legacy code; and optimizing, by the at least one processor, the first set of pseudocode in order to generate a second set of pseudocode that is more compact than the first set of pseudocode.

2. The method of claim 1, wherein the grammar comprises a plurality of syntactic rules of the first programming language that facilitate an ability to write code in the first programming language.

3. The method of claim 1, wherein the optimizing comprises using a set of optimization rules for grouping combinations of operators and generating a common mapping for the grouped combinations of operators.

4. The method of claim 1, wherein the analyzing comprises:

defining a set of terminals that includes a set of character strings together with corresponding expressions that capture the character strings;

assembling a set of operator-arguments pairs from the corpus and matching each respective operator-arguments pair with a corresponding terminal from within the set of terminals;

generating a respective rule for each operator-arguments pair; and iteratively collapsing a plurality of terminal combinations into reusable non-terminals.

5. The method of claim 1, wherein the FSM includes a compact FSM for which each state is represented by a respective line number that is currently being executed by the first set of legacy code.

6. The method of claim 1, wherein the FSM includes a full FSM for which each state is represented by a respective line number, a respective set of register values, a respective set of condition codes, and a set of memory content that correspond to the first set of legacy code.

7. The method of claim 1, wherein the first programming language includes an Assembly language.

8. A computing apparatus for automatically understanding legacy code, the computing apparatus comprising:

a processor;

a memory; and a communication interface coupled to each of the processor and the memory, wherein the processor is configured to:

receive, via the communication interface, a first set of legacy code that is written in a first programming language;

receive a corpus of code written in the first programming language;

analyze a subset of the corpus of code, by applying an artificial intelligence (AI) model that is trained by using a plurality of code corpuses that respectively correspond to a plurality of programming languages, in order to induce a grammar of the first programming language, wherein the grammar provides all possible sequences of strings that amount to a syntactically valid program, and wherein the all possible sequences of strings include all possible combination of operator-argument pairs;

convert, based on the grammar, the first set of legacy code into a finite-state machine (FSM) that is usable for detecting branches and loops of the first set of legacy code, wherein the FSM is expressible as a set of tuples within which each respective tuple includes a first element that relates to a set of states that are defined by respective attributes and a second element that relates to a set of transitions that facilitate movement across states;

use the FSM to generate a first set of pseudocode that corresponds to the first set of legacy code; and optimize the first set of pseudocode in order to generate a second set of pseudocode that is more compact than the first set of pseudocode.

9. The computing apparatus of claim 8, wherein the grammar comprises a plurality of syntactic rules of the first programming language that facilitate an ability to write code in the first programming language.

10. The computing apparatus of claim 8, wherein the processor is further configured to perform the optimization by using a set of optimization rules for grouping combinations of operators and generating a common mapping for the grouped combinations of operators.

11. The computing apparatus of claim 8, wherein the processor is further configured to perform the analysis by:

defining a set of terminals that includes a set of character strings together with corresponding expressions that capture the character strings;

assembling a set of operator-arguments pairs from the corpus and matching each respective operator-arguments pair with a corresponding terminal from within the set of terminals;

generating a respective rule for each operator-arguments pair; and iteratively collapsing a plurality of terminal combinations into reusable non-terminals.

12. The computing apparatus of claim 8, wherein the FSM includes a compact FSM for which each state is represented by a respective line number that is currently being executed by the first set of legacy code.

13. The computing apparatus of claim 8, wherein the FSM includes a full FSM for which each state is represented by a respective line number, a respective set of register values, a respective set of condition codes, and a set of memory content that correspond to the first set of legacy code.

14. The computing apparatus of claim 8, wherein the first programming language includes an Assembly language.

15. A non-transitory computer readable storage medium storing instructions for automatically understanding legacy code, the storage medium comprising executable code which, when executed by a processor, causes the processor to:

receive a first set of legacy code that is written in a first programming language;

receive a corpus of code written in the first programming language;

analyze a subset of the corpus of code, by applying an artificial intelligence (AI) model that is trained by using a plurality of code corpuses that respectively correspond to a plurality of programming languages, in order to induce a grammar of the first programming language, wherein the grammar provides all possible sequences of strings that amount to a syntactically valid program, and wherein the all possible sequences of strings include all possible combination of operator—argument pairs;

convert, based on the grammar, the first set of legacy code into a finite-state machine (FSM) that is usable for detecting branches and loops of the first set of legacy code, wherein the FSM is expressible as a set of tuples within which each respective tuple includes a first element that relates to a set of states that are defined by respective attributes and a second element that relates to a set of transitions that facilitate movement across states;

use the FSM to generate a first set of pseudocode that corresponds to the first set of legacy code; and optimize the first set of pseudocode in order to generate a second set of pseudocode that is more compact than the first set of pseudocode.

16. The storage medium of claim 15, wherein the grammar comprises a plurality of syntactic rules of the first programming language that facilitate an ability to write code in the first programming language.

* * * * *